United States Patent
Giefer et al.

(10) Patent No.: US 7,334,497 B2
(45) Date of Patent: Feb. 26, 2008

(54) MONOSTABLE SHIFTING DEVICE WITH P POSITION

(75) Inventors: Andreas Giefer, Lemförde (DE); Jörg Meyer, Wagenfeld (DE)

(73) Assignee: ZF Lemförder Metallwaren AG, Stemwede-Dielingen (DE)

( * ) Notice: Subject to any disclaimer, the term of this patent is extended or adjusted under 35 U.S.C. 154(b) by 711 days.

(21) Appl. No.: 10/814,006

(22) Filed: Mar. 31, 2004

(65) Prior Publication Data

US 2004/0194567 A1 Oct. 7, 2004

(30) Foreign Application Priority Data

Apr. 4, 2003 (DE) ................. 103 15 644

(51) Int. Cl.
*B60K 17/04* (2006.01)
(52) U.S. Cl. ............... 74/473.12; 74/473.14; 74/473.23; 74/473.25
(58) Field of Classification Search ............. 74/473.1, 74/473.12, 473.14, 473.19, 473.23, 473.24, 74/473.25
See application file for complete search history.

(56) References Cited

U.S. PATENT DOCUMENTS

| | | | |
|---|---|---|---|
| 6,360,624 B1 | 3/2002 | Sedlmaier et al. | |
| 6,406,102 B1 * | 6/2002 | Arnold | 303/20 |
| 6,508,139 B2 * | 1/2003 | Onodera | 74/335 |
| 6,662,924 B2 * | 12/2003 | Giefer et al. | 192/220.7 |
| 2002/0170376 A1 | 11/2002 | Giefer et al. | |

FOREIGN PATENT DOCUMENTS

| | | |
|---|---|---|
| DE | 41 20 379 A1 | 1/1993 |
| DE | 197 56 034 A1 | 7/1999 |
| DE | 199 16 924 A1 | 10/2000 |
| DE | 694 25 755 T2 | 4/2001 |
| DE | 100 05 167 A1 | 8/2001 |

* cited by examiner

*Primary Examiner*—David M. Fenstermacher
(74) *Attorney, Agent, or Firm*—McGlew and Tuttle, P.C.

(57) ABSTRACT

A shifting device for the preferably powerless transmission of shift commands to a fully automatic or semi-automatic transmission of a motor vehicle and a frame and/or housing and a gearshift lever mounted pivotably along a shift gate. A first shift stop and a second shift stop are provided for the gearshift lever which each define a shift position for the said gearshift lever. At least one detection device is provided for detecting the shift position(s). An inoperative position is provided into which the gearshift lever pivots back by itself from the deflected shift position, driven by a restoring force. The shifting device has an actuating device, which can countermand a shift stop, so that the gearshift lever can be pivoted beyond the shift position(s) defined by this shift stop.

25 Claims, 4 Drawing Sheets

CONTROL UNIT — 50

MONOSTABLE SHIFTING DEVICE WITH P POSITION

CROSS REFERENCE TO RELATED APPLICATIONS

This application claims the benefit of priority under 35 U.S.C. § 119 of German patent application DE 103 15 644 filed Apr. 4, 2003 the entire contents of which are incorporated herein by reference.

FIELD OF THE INVENTION

The present invention pertains a shifting device for the preferably powerless transmission of shift commands to a fully automatic or semi-automatic transmission of a motor vehicle with a frame and/or housing, a gearshift lever mounted pivotably along a shift gate, and a first shift stop and a second shift stop for the gearshift lever, which determine a shift position each of the gearshift lever. Such a shifting device has at least one detection device for detecting the shift positions, wherein an inoperative position, into which the gearshift lever pivots back by itself from a deflected shift position, driven by a restoring force, is arranged between these shift positions.

BACKGROUND OF THE INVENTION

A shifting device for the powerless transmission of shift commands with a pivoted lever, which can be pivoted along a shift gate, wherein commands are transmitted to an automatic gear box by detection means for detecting the shift position, is known from the patent application DE 100 05 167 A1 (see also U.S. Pat. No. 6,662,924 which is hereby incorporated by reference). This is a shifting device in which a position of the gearshift lever is assigned to every individual gear, wherein the gearshift lever remains in the particular shift position and thus also sends a haptic feedback concerning the gear being selected to the driver.

Furthermore, a "shift by wire" shifting device is known from the patent application DE 197 56 034 A1, in which the gearshift lever is pivotable along a shift gate, and an inoperative position, into which the gearshift lever returns by itself from a deflected shift position, driven by a restoring force, is located between the shift positions, which are defined by shift stops.

In addition, reference is being made to the patent application DE 199 16 924 A1, which describes the basic function of an automatic shifting device. A selector lever is shown here, which can be moved along a shift gate for preselecting individual gears in two deflection directions and always returns by itself into the same starting position from the two deflection directions, wherein two different gears can be selected in at least one deflection direction of the selector lever by the selector lever being moved over a first section up to a first "stop" in the deflection direction for selecting a first gear, and the selector lever is moved over a second, longer section in the same deflection direction for selecting a second gear up to a second "stop," while the first stop is pushed over. Since at least the particular first "stop" can be pushed over, it is not an actual stop in the original sense of this word, but only a perceptible intermediate position of the gearshift lever. The kinematic solution is, however, not disclosed in this document.

Consequently, the "shift by wire" shifting devices have essentially two embodiments, namely, shifting devices with fixed, stable gearshift lever positions and shifting devices with a single inoperative position and other unstable shift positions, into which the gearshift lever can be briefly deflected. Both variants have advantages and disadvantages. The current position of the transmission can be detected by feeling and can be seen at any time at the selector lever in shifting devices with fixed positions during normal operation, so that the driver is always informed of the current situation of the transmission. The mechanical connection with the transmission is absent in the "shift by wire" systems, and it is possible that the position of the selector lever does not agree with the position of the transmission, because certain positions of the gearshift lever or certain shift commands are not performed by the automatic transmission, because these may be interrupted by a logic verification in order to avoid unintended or destructive shifting actions.

Monostable shifting devices have no haptic feedback on the current position of the transmission, so that it is also impossible to transmit false information on the current shift position to the driver. In case of monostable shifting devices, the activation of a parking brake takes place in automatic transmissions mostly by means of an automatic switch, which is arranged, e.g., at the knob. A direct haptic feedback by the shifting device to the driver indicating that a certain situation of the transmission is present, e.g., that the parking brake is engaged, is not known, so that misunderstandings may occur, for example, concerning a key lock.

SUMMARY OF THE INVENTION

The object of the present invention is therefore to provide a shifting device for the powerless transmission of shift commands, which makes it possible to combine the advantages of a shifting device that is stable in a plurality of shift positions with those of a monostable shifting device, so that, on the one hand, no transmission position that does not correspond to the current state is displayed, on the one hand, and, on the other hand, an unambiguous feedback is sent to the driver on the particular state of the parking brake and consequently on permissible actions, e.g., the removal of the ignition key.

According to the invention, a shifting device is provided for the preferably powerless transmission of shift commands to a fully automatic or semi-automatic transmission of a motor vehicle and a frame and/or housing and a gearshift lever mounted pivotably along a shift gate. A first shift stop and a second shift stop are provided for the gearshift lever which each define a shift position for the said gearshift lever. At least one detection device is provided for detecting the shift position(s). An inoperative position is provided into which the gearshift lever pivots back by itself from the deflected shift position, driven by a restoring force. The shifting device has an actuating device, which can countermand a shift stop, so that the gearshift lever can be pivoted beyond the shift position(s) defined by this shift stop.

Reference is being made here to the fact that a shift stop is to be defined in the sense of this application as an actual stop against a mechanical resistance that cannot be overcome with a normal force. Such a shift stop is not to be confused with the "stop" mentioned in the above-mentioned patent application DE 199 16 924 A1, which can be pushed over by the application of a normal force. Such a "stop" is only an intermediate position of a gearshift lever, which is fixed by a pressure point, on the way to an actual terminal shift stop. The mechanical and kinematic design of this shifting design is also described in the patent application cited only as related to the object, and a solution was not disclosed for the person skilled in the art.

Consequently, a monostable shifting device with two mechanically limited shift positions is presented in the design according to the present invention, wherein at least one of the mechanical limitations of the shift positions can be canceled by an actuating device and an unambiguous feedback is thus sent to the driver when it becomes possible to pivot the gearshift lever into a third shift position. Corresponding to the object, the advantages of the monostable shifting device are consequently combined hereby with the improved feedback of a multistable shifting device due to its better feedback.

The inventor provides in a special embodiment of the shifting device that at least one shift stop is formed by a gearshift lever-side stop face moving with the gearshift lever and a stop face that is stationary in relation to the movement of the gearshift lever, where the gearshift lever-side stop face is formed by a stop element connected with the gearshift lever, preferably a pin at the gearshift lever. The stationary stop face may be formed by a stop element that is in connection with the frame or housing, wherein the stop element can be deflected by means of an actuating device such that the original stop becomes ineffective in the deflected state.

It is especially advantageous for the stop element to be a rocker arm, which is mounted pivotably around a rocker arm pivot axis, wherein the rocker arm pivot axis itself is mounted in a preferred embodiment on a pivotable emergency lever in an emergency lever shaft, with emergency lever is connected with an emergency release of the automatic transmission and can actuate same by its deflection. This design makes it possible to connect the above-described shifting device with a preferably mechanical emergency release of the automatic transmission, as it was described, in principle, in the above-mentioned patent application DE 100 05 167 A1.

In addition, a locking element may be provided, which can prevent the actuation of the emergency release by blocking the pivoting of the emergency lever. Such a locking element may be, for example, a rocker element mounted on a shaft, which said rocker element prevents the pivoting of the rocker arm around the emergency lever shaft in one blocked position, while it permits this pivoting in another, released position.

In a special embodiment, the gearshift lever of the shifting device according to the present invention may have a coupling element, which is fastened to the stop element, so that a fixed coupling is brought about between the gearshift lever and the stop element. In a preferred embodiment of the shifting device, the gearshift lever has a button, which is directly connected with the actuating device in order to release this mechanically by pressing the button. Such an actuating device may have, for example, a longitudinally displaceable push rod, which can move a pin along the gearshift lever.

Furthermore, the inventor proposes in another embodiment of the shifting device that the actuating device be connected only indirectly with a button at the gearshift lever, so that the button can trigger the cancellation of the mechanical stop by the button being pressed or by generating another signal.

The actuating device may have a plunger, which is preferably operated electromagnetically and brings about the pivoting out of a stop face or at least makes possible the cancellation of an interlock means that was previously present. For example, such a plunger may be designed and arranged such that it can pivot out the rocker arm, which is preferably loaded by a spring in the opposite direction, so that the shift stop, which was formed by this rocker arm, now becomes ineffective.

According to the present invention, the shifting device may also have for the locking element a preferably electrically controlled releasing device, which makes it now possible to allow or prevent the release, e.g., of a rocker arm, as desired, and thus to rule out possible undesired shifting situations, for example, the actuation of an emergency release, as a function of a certain position of the ignition key.

The movement of the gearshift lever, whose path can be increased by deactivating a shift stop, is additionally limited according to the present invention by another shift stop located behind it, so that this shift stop defines a maximally deflected shift position of the gearshift lever.

The detection device may have a Hall sensor, an optical sensor or even an electric switch for at least one of the shift positions. Such embodiments are generally known in the state of the art and may be used here as desired.

Furthermore, the restoring force of the gearshift lever may be generated by a spring-loaded roller or a spring-loaded sliding element, which said roller/sliding element is coupled with the gearshift lever and extends over a curve that is a rigid part of the housing. A similar design is known, e.g., from the above-mentioned DE 197 56 034 A1 (which is hereby incorporated by reference). It shall be mentioned in this connection that a kinematic reversal of such a design is also possible by arranging, e.g., a curve, which moves over a spring-loaded roller arranged at the housing or a spring-loaded sliding element, at the gearshift lever, and a stationary roller or a stationary sliding element, which moves over a spring-loaded curve, is also conceivable.

Furthermore, the shifting device according to the present invention may have an electronic or program-controlled circuit, which controls the actuating device to countermand a shift stop, preferably taking into account the current driving conditions and/or the current shifting state.

An electronic or program-controlled circuit may also be provided for triggering the locking element, preferably taking into account the current driving conditions and/or the current shifting state, and it should be pointed out in this connection that the above-mentioned two circuits may also be integrated within a single circuit.

It shall also be mentioned in addition that the dimensions of the stop faces being described here may also be relatively small, i.e., nearly punctiform, linear or curved without going beyond the scope of the present invention. In addition, it shall be mentioned that the detection devices being described are switches, Hall sensors or similar means for generating a shift command in the case of powerless transmission, while the detection device may also be designed as a mechanical or hydraulic coupling element to the automatic transmission in case of a shifting device operated with frictional connection for transmitting shift commands.

Other features and advantages of the present invention will appear from the subclaims and the following description of a preferred exemplary embodiment with reference to the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
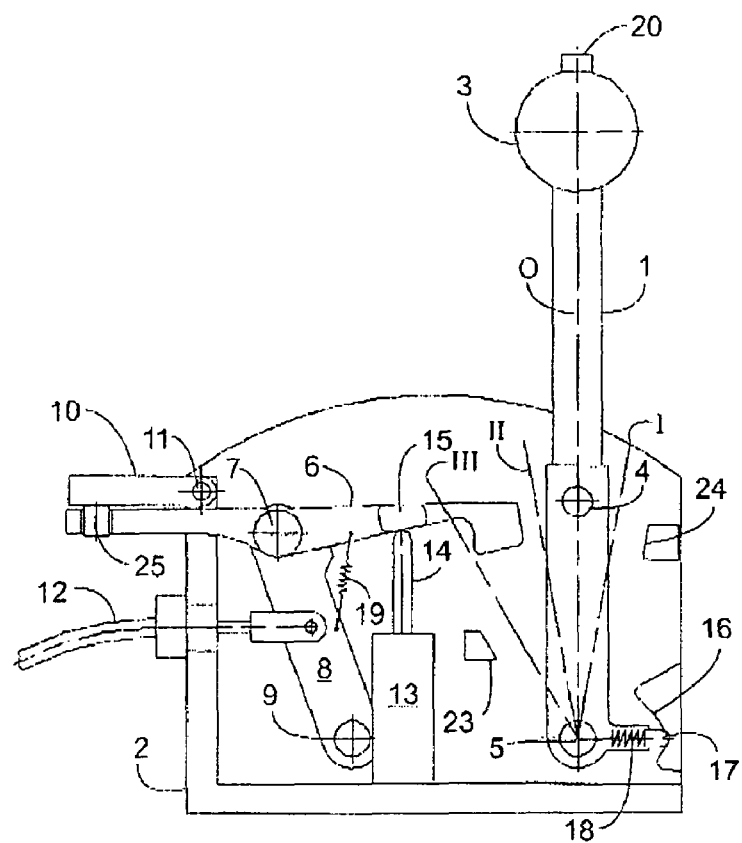
FIG. 1 is a schematic longitudinal sectional view through the shifting device with the gearshift lever in the neutral position.

FIG. 1 shows a schematic view of a longitudinal section of a preferred shifting device according to the present invention. Obvious and known individual parts of the shifting device are not shown for clarity's sake, and the presentation was limited to the essential functional structural components of the embodiment according to the invention. For example, the generally known detection devices for detecting a particular shift position are not shown.

FIG. 1 shows the shifting device according to the present invention with a gearshift lever 1, which is mounted pivotably around a shift axis 5. A pin 4, which acts as a gearshift lever-side stop face, is located at the gearshift lever 1 on the side. The gearshift lever 1 has a shift knob 3 and, at the lower end, a right-angled extension, which accommodates a sliding element 17, which is pressed by a spring 18 elastically onto a curve 16 arranged on the housing side. The curve 16 is designed such that the gearshift lever 1 stabilizes itself in the position being shown, while a deflection into a front or rear position takes place only by an ergonomically pleasant resistance by the sliding element 17 compressing the spring 18 during its sliding over the curve 16. This correspondingly leads to a restoring force for the gearshift lever 1 from the deflected positions, which always causes a return in unloaded situations into the neutral position being shown here. A stop contour 24, which is struck by the gearshift lever 1 as soon as the latter is deflected in a forward direction, which corresponds to the right-hand side here, is located in the housing 2, which is shown only very schematically, so that a first shift position is defined hereby. This shift position is detected by corresponding detection means and can be passed on to an automatic or semi-automatic transmission.

Figure 2:
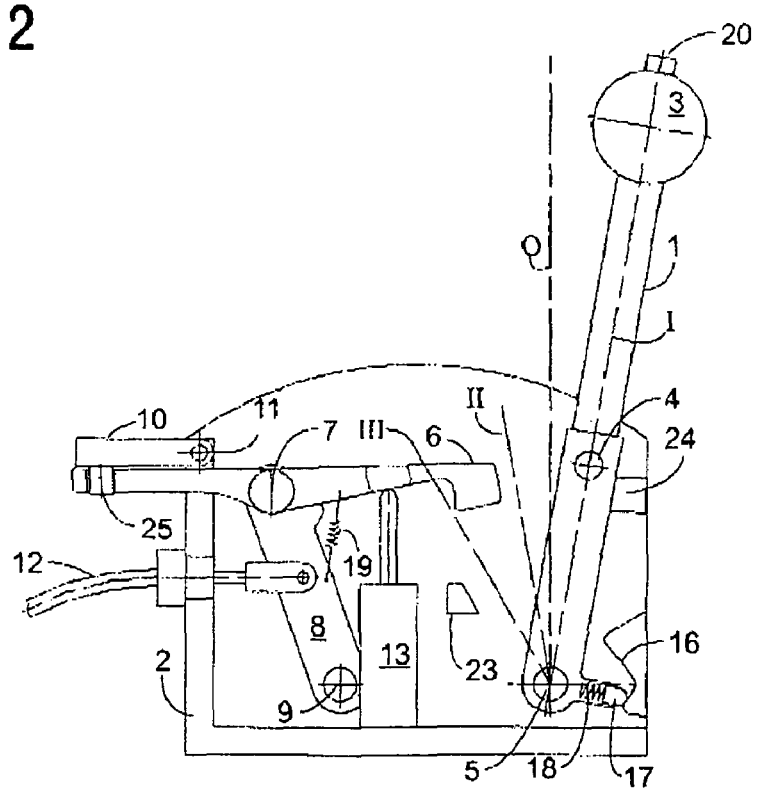
FIG. 2 is a longitudinal sectional view through the shifting device with the gearshift lever in the front shifting position.

This situation is shown in FIG. 2, which shows the gearshift lever 1 in the front shift position, wherein the gearshift lever 1 has struck the stop contour 24, which is a rigid part of the housing.

Figure 3:
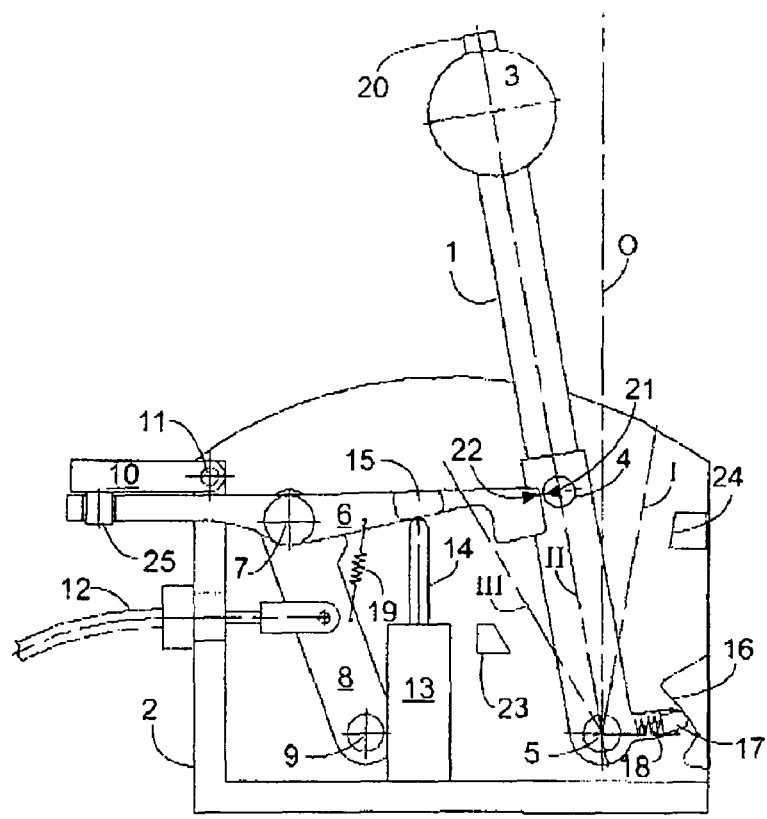
FIG. 3 is a schematic longitudinal sectional view through the shifting device with the gearshift lever in the rear first shift position at the disengageable shift stop.

If the gearshift lever is moved, as is shown in FIG. 3, in the rearward direction, the pin 4 arranged to the side of the gearshift lever 1 with its stop face 21 strikes the stop face 22 of the rocker arm 6 and thus forms a second shift position of the gearshift lever 1. This shift position is detected by a detection device in this case as well and it can be passed on, if desired, to the automatic transmission, so that a corresponding shifting operation is initiated in the automatic transmission.

The rocker arm 6, at the front end of which the stop face 22 is located, is mounted pivotably by means of a rocker arm pivot axis 7. The rocker arm pivot axis 7 is located, in turn, at the end of a likewise pivotably mounted emergency lever 8, wherein the emergency lever shaft 9, around which the emergency lever 8 is pivotable, is located at the opposite end of the rocker arm pivot axis 7. The emergency lever shaft 9 is stationarily connected in this embodiment with the housing 2 or with the frame connected thereto, which is not shown in detail here.

A bowden cable 12, which is responsible for the mechanical release of the parking brake of the automatic transmission, acts between the rocker arm pivot axis 7 and the emergency lever shaft 9.

It shall be pointed out that the second shifting device being shown here cannot be pushed over by any means in the state of the shift position being shown in FIGS. 1 through 3 by a normal force application at the gearshift lever 1, but only the two end positions of the gearshift lever being shown in FIGS. 1 through 3 are available to the driver in this state, and the gearshift lever always pivots back by itself from these end positions into the middle, neutral position. Consequently, this is the shifting principle of a "tiptronic" shifting, in which a certain command is passed on to the automatic transmission by briefly pivoting the gearshift lever out into a front or rear position in relation to the neutral position. This may mean, on the one hand, the command for upshifting or downshifting the transmission, or the front position is used for a transmission situation for the normal forward drive, and the rear shift position is used to engage the reverse gear, in which case an additional logic verification is necessary, so that damage to the transmission cannot occur due to the gearshift lever 1 being accidentally moved into an R position if the vehicle is moving forward at a high rate of speed.

If the driver would now like to shift the automatic transmission into a park state or the P position, he can actuate a pushbutton 20 located at the knob, by which the actuating device according to the present invention allows the rear shift stop to become ineffective.

In the exemplary embodiment being shown here, this actuating device is a plunger 14, which causes the rocker arm 6 to jump up around the rocker arm pivot axis 7 by means of an electromagnetic drive 13 by acting on a pin 15 arranged laterally at the rocker arm. It shall be pointed out in this connection that besides the electric or electronic connection between the pushbutton 20 at the gearshift lever 1 and the actuating device, it is also possible to provide a mechanical coupling. For example, a bowden cable, which brings about the disengagement of the rocker arm 6, can be actuated by actuating the pushbutton 20.

Figure 4:
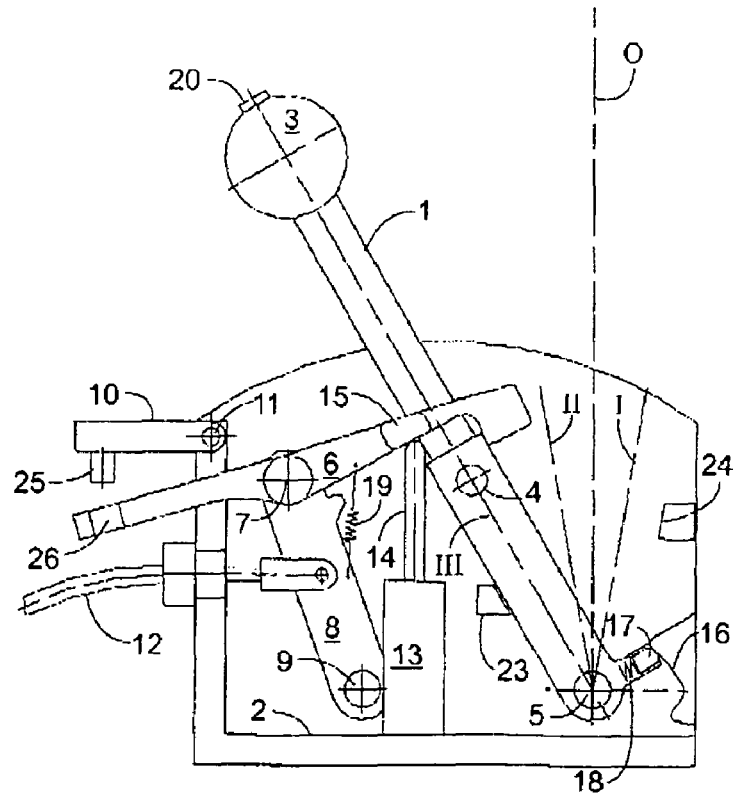
FIG. 4 is a schematic longitudinal sectional view through the shifting device with the rocker arm and the shift stop disengaged in the extreme rear shift position.

If the gearshift lever 1 is in the rear shift position being shown in FIG. 4, the corresponding shift command can be passed on to the automatic transmission by a detection device. It shall be additionally pointed out that in its rear position, the gearshift lever 1 strikes a second stop contour 23, which is a rigid part of the housing or frame here, and the third shift position is thus unambiguously defined.

If the pushbutton 20 is now released by the driver, the lowering of the plunger 14 brings about at the same time the pivoting down of the rocker arm 6, which has a hook-like contour on its front side and surrounds the pin 4 of the gearshift lever 1, so that locking of the gearshift lever 1 is generated in this position.

Figure 5:
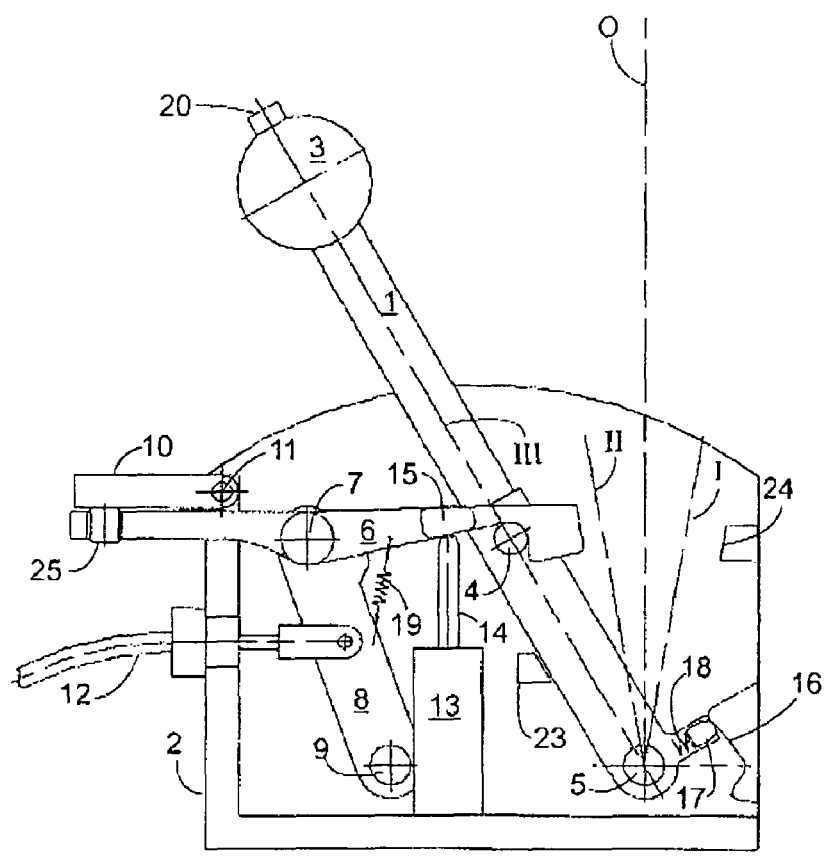
FIG. 5 is a schematic longitudinal sectional view through the shifting device with the gearshift lever according to FIG. 4 with the rocker arm fastened.

FIG. 5 shows such a situation, and it shall also be pointed out, in addition, that a locking lever 10 with a pin 25 at the rear end of the rocker arm 6 engages an opening 26 at the rocker arm. The emergency lever 8 is at the same time prevented from pivoting by this coupling between the rocker arm 6 and the locking lever 10, whose pivot axis is mounted rigidly on the housing, so that emergency release of the transmission by the bowden cable 12, which acts on the emergency lever 8, is not possible.

Figure 6:
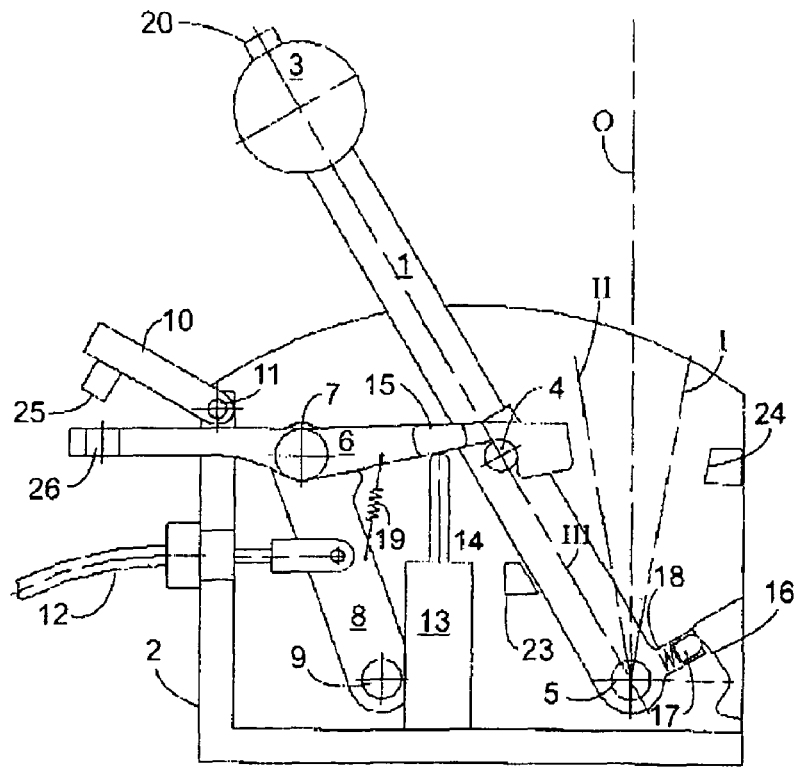
FIG. 6 is a schematic longitudinal sectional view through the shifting device with the gearshift lever and the rocker arm in the position according to FIG. 5 with the locking lever released.

An actuating device for the locking lever 10, which said actuating device is not shown explicitly here, is actuated only by an additional action on the part of the driver, preferably by the removal of the ignition key, so that the locking lever 10 is pivoted upward around the locking lever pivot axis 11 and, as is shown in FIG. 6, it releases the rocker arm 6 in conjunction with the emergency lever 8 for forward movement.

Figure 7:
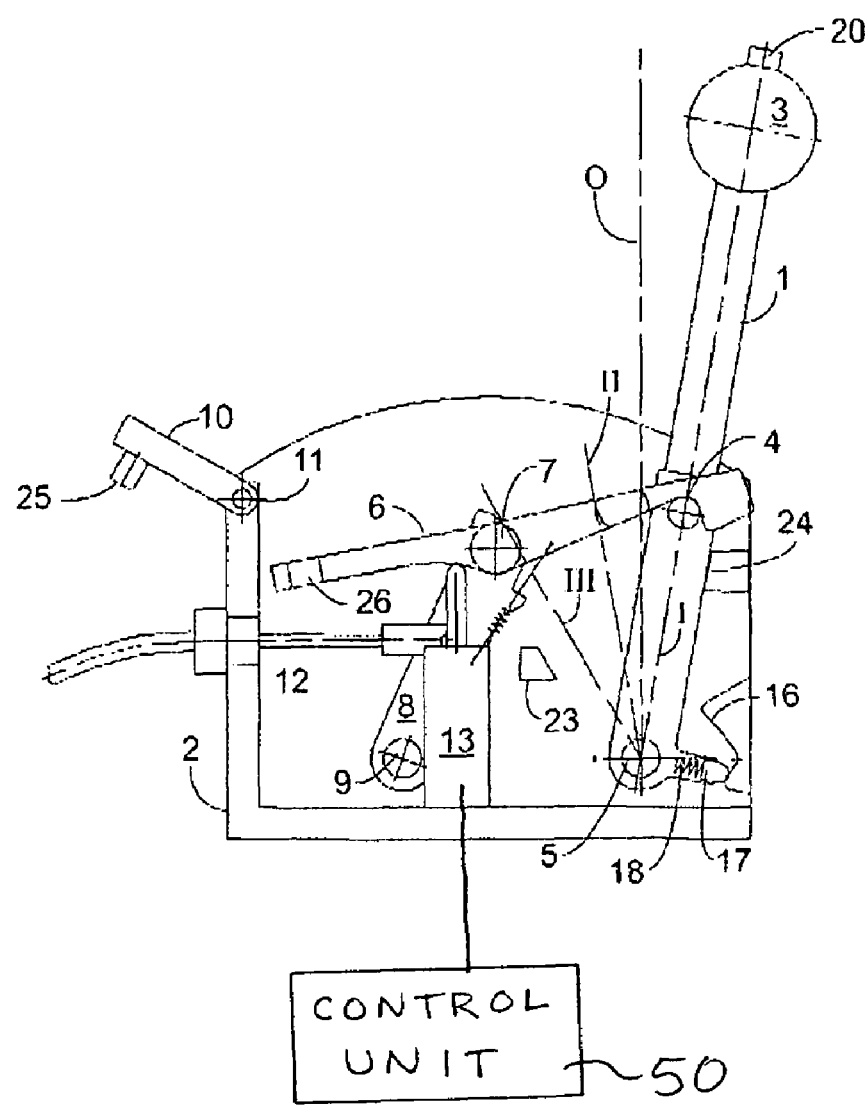
FIG. 7 is a schematic longitudinal sectional view through the shifting device with the gearshift lever in the frontmost shift position and activated parking brake release.

Such a forward movement after the release of the rocker arm 6 due to the raising of the locking lever 10 is shown in FIG. 7. On its front side, the rocker arm 6 is fastened to the pin 4 at the gearshift lever, so that the pivoting of the gearshift lever into the front shift position also brings about at the same time the pulling out of the core of the bowden cable 12, as a result of which the mechanical release of the parking brake of the automatic transmission of the vehicle is triggered.

The shifting device may include or be used with an electronic or program-controlled control circuit or control unit 50 for controlling the actuating device 13, 14 for countermanding a shift stop, taking into account the current driving conditions and/or the current shifting state. The electronic or program-controlled circuit 50 may also be provided for triggering the locking element taking into account the current driving conditions and/or the current shifting state.

The embodiment of the shifting device according to the present invention being shown here consequently demonstrates that it is possible to design a monostable shifting device such that besides a first shift position and a second shift position, which can be reached by simply tipping the gearshift lever, a third shift position is additionally possible, but this is made available to the driver only under predetermined conditions of the transmission or the vehicle, and the driver can unambiguously recognize by a haptic feedback whether this third shift position can be engaged based on the status of the vehicle or the vehicle transmission, and, in addition, the gearshift lever remains in or can be maintained in this third shift position once it has been engaged.

This is achieved due to the fact that a monostable shifting device, whose movement is limited at first by two stops to two shift positions, can be moved into a third position by disengaging at least one of the limiting stops and optionally, if the second stop is also disengaged, into a fourth position, and this takes place as a function of the particular situation of the transmission.

It is obvious that the above-described features of the present invention are applicable not only in the particular combination described, but also in other combinations or alone without going beyond the scope of the present invention. Bringing about a mechanical reversal of the functions of the individual mechanical elements of the present invention is also within the scope of the present invention. While a specific embodiment of the invention has been shown and described in detail to illustrate the application of the principles of the invention, it will be understood that the invention may be embodied otherwise without departing from such principles.

LIST OF REFERENCE NUMBERS

1 Gearshift lever
2 Housing with frame
3 Shift knob
4 Pin
5 Shift axis
6 Rocker arm
7 Rocker arm pivot axis
8 Emergency lever
9 Emergency lever shaft
10 Locking lever
11 Locking lever pivot axis
12 Bowden cable for parking brake emergency release
13 Electromagnetic drive for plunger
14 Plunger
15 Pin at rocker arm
16 Curve
17 Sliding element
18 Spring
19 Spring
20 Pushbutton
21 Stop face
22 Stop face
23 Housing-side stop contour
24 Housing-side stop contour
25 Pin
26 Opening
I, II, III Shift positions
O Inoperative position

What is claimed is:

1. A shifting device for the preferably powerless transmission of shift commands to a fully automatic or semi-automatic transmission of a motor vehicle, the shifting device comprising:
   a frame and/or housing;
   a gearshift lever mounted pivotably along a shift gate;
   a first shift stop defining a shift position of the gearshift lever;
   a second shift stop for the gearshift lever defining a shift position of the gearshift lever; and
   at least one detection device for detecting one or both of the shift positions, the shifting device having an inoperative position, into which the gearshift lever pivots back by itself from a deflected shift position driven by a restoring force; and
   an actuating device countermanding one of said shift stops so that the gearshift lever can be pivoted beyond one of said the positions defined by said one shift stop, said one shift stop being an actual stop against a mechanical resistance that can not be overcome with normal force.

2. A shifting device in accordance with claim 1, wherein the actuating device is indirectly connected with a button at the gearshift lever in order to be triggered by pushing, the pushing of the button electrically causes actuation or generates another signal.

3. A shifting device in accordance with claim 1, wherein the actuating device which brings about or makes possible the pivoting out of a stop face.

4. A shifting device in accordance with claim 1, wherein another said shift stop, which defines a maximally deflected shift position of the gearshift lever, is provided at least in the deflection direction of the gearshift lever.

5. A shifting device in accordance with claim 1, wherein the detection device has one of a Hall sensor, optical sensor, and electric switch for at least one of the shift positions.

6. A shifting device in accordance with claim 1, wherein the restoring force of the gearshift lever is generated by a spring-loaded roller or a spring-loaded sliding element, which said roller/sliding element is coupled with the gearshift lever and moves over a curve, which is a rigid part of the housing.

7. A shifting device in accordance with claim 1, further comprising: an electronic or program-controlled control circuit for controlling the actuating device for countermanding a shift stop, taking into account the current driving conditions and/or the current shifting state.

8. A shifting device for transmission of shift commands to a fully automatic or semi-automatic transmission of a motor vehicle, the shifting device comprising:
   a frame and/or housing;
   a gearshift lever mounted pivotably along a shift gate;
   a first shift stop defining a shift position of the gearshift lever;
   a second shift stop for the gearshift lever defining a shift position of the gearshift lever;
   at least one detection device for detecting one or both of the shift positions, the shifting device having an inoperative position, into which the gearshift lever pivots back by itself from a deflected shift position driven by a restoring force;
   an actuating device countermanding a shift stop so that the gearshift lever can be pivoted beyond one of said the positions defined by the associated shift stop;
   at least one shift stop being formed by a gearshift lever-side stop face moving with the gearshift lever and by a stop face that is stationary in relation to the movement of the gearshift lever;
   the gearshift lever-side stop face being formed by a stop element connected with the gearshift lever and including a pin at the gearshift lever;
   said at least one shift stop being deflected by means of the actuating device such that the original stop is ineffective in the deflected position;
   said at least one shift stop including a rocker arm, which is mounted pivotably around a rocker arm pivot axis;
   the rocker arm pivot axis being mounted on a pivotable emergency lever in an emergency lever shaft, said emergency lever being connected with a emergency release means of the transmission and can actuate the emergency release mechanism by its deflection;
   a locking element preventing the emergency lever from pivoting.

9. A shifting device in accordance with claim 8, wherein the actuating device has an electromagnetically operated plunger, which can pivot out the rocker arm loaded by a spring.

10. A shifting device in accordance with claims 8 wherein the locking element has an electrically controlled releasing device.

11. A shifting device in accordance with claim 8, wherein an electronic or program-controlled circuit is provided for triggering the locking element taking into account the current driving conditions and/or the current shifting state.

12. A shifting device in accordance with claim 8, wherein:
   said locking element is a rocker element, which is mounted on a shaft and can prevent said rocker arm from being pivoted around said emergency lever shaft in a blocked position and permits this pivoting in another released position.

13. A shifting device in accordance with claim 12, wherein the stationary stop face is formed by a stop element that is in connection with the frame and/or housing.

14. A shifting device in accordance with claim 12, wherein the gearshift lever has a coupling element, which can be fastened to said at least one shift stop element.

15. A shifting device in accordance with claim 1, wherein the actuating device is directly connected with a button at the gearshift lever in order for it to be able to be mechanically triggered by pushing the button.

16. A shifting device in accordance with claim 15 wherein the actuating device has a longitudinally displaceable push rod, which can move a pin along the gearshift lever.

17. A shifting device in accordance with claim 12, wherein:
   said rocker arm defines an opening;
   said locking element includes a pin engaging with said opening in said rocker arm in said blocked position.

18. A shifting device in accordance with claim 12, wherein:
   said shift stop countermanded by said actuating device is an actual stop against a mechanical resistance that cannot be overcome with normal force.

19. A shifting device in accordance with claim 8, wherein:
   said shift stop countermanded by said actuating device is an actual stop against a mechanical resistance that cannot be overcome with normal force.

20. A shifting device comprising:
   a housing defining a shift gate with first and second shift positions, and an intermediate position;
   a gearshift lever mounted pivotably in said housing along said shift gate;
   a restoring device biasing said gear shift lever into said intermediate position;
   a detection device for detecting said gearshift lever in one of said shift positions;
   a first shift stop arranged on said housing and defining said first shift position of the gearshift lever;
   a second shift stop defining said second shift position, said second shift stop being movably arranged on said housing between first and second locations, said first location of said second shift stop preventing said gear shift lever from moving past said second shift position;
   an actuating device moving said second shift stop into said second location to increase said shift gate beyond said second shift position.

21. A shifting device in accordance with claim 20, wherein:
   said second shift stop is arranged to be connected with said gearshift lever when said gearshift lever is beyond said second shift position and said second shift stop is in said second location, said second shift stop being movable with said gearshift lever toward said intermediate position when said second shift stop is connected with said gearshift lever.

22. A shifting device in accordance with claim 21, further comprising:
  a release mechanism connected to said second shift stop and releasing a transmission when said second shift stop and said gearshift lever move toward said intermediate position.

23. A shifting device in accordance with claim 21, further comprising:
  a lock for preventing said second shift stop from moving toward said intermediate position.

24. A shifting device in accordance with claim 20, further comprising:
  a selector device selectively controllable by the operator of the shifting device to select one of said locations of said second shift stop.

25. A shifting device in accordance with claim 24, further comprising:
  a control circuit reading a selection of said selector device and controlling said actuating device taking into account current driving conditions and/or a current shifting state.

* * * * *